(12) United States Patent
Kosover et al.

(10) Patent No.: US 7,907,190 B2
(45) Date of Patent: Mar. 15, 2011

(54) IMAGE SENSOR MULTIPLE OUTPUT METHOD

(75) Inventors: Yoram Kosover, Rishon Lezion (IL); Achmed Aladin, Nazareth (IL); Stanley Barkan, Hof Hacarmel (IL); Dov Kalinski, Hod Hasharon (IL)

(73) Assignee: Eastman Kodak Company, Rochester, NY (US)

( * ) Notice: Subject to any disclaimer, the term of this patent is extended or adjusted under 35 U.S.C. 154(b) by 743 days.

(21) Appl. No.: 10/575,934

(22) PCT Filed: Oct. 11, 2004

(86) PCT No.: PCT/IL2004/000934
§ 371 (c)(1),
(2), (4) Date: Jan. 2, 2008

(87) PCT Pub. No.: WO2005/039173
PCT Pub. Date: Apr. 28, 2005

(65) Prior Publication Data
US 2008/0211942 A1    Sep. 4, 2008

Related U.S. Application Data

(60) Provisional application No. 60/512,632, filed on Oct. 20, 2003.

(51) Int. Cl.
*H04N 5/217*    (2006.01)

(52) U.S. Cl. ........ 348/241; 348/243; 348/245; 348/246; 348/247; 348/36

(58) Field of Classification Search .................. 348/241, 348/243, 245, 246, 247, 36–39, 222.1
See application file for complete search history.

(56) References Cited

U.S. PATENT DOCUMENTS

| | | | |
|---|---|---|---|
| 4,916,551 A | 4/1990 | Lin et al. | |
| 6,348,981 B1 | 2/2002 | Walsh | |
| 7,050,098 B2 * | 5/2006 | Shirakawa et al. | 348/245 |

FOREIGN PATENT DOCUMENTS

| | | |
|---|---|---|
| EP | 0946043 | 9/1999 |
| EP | 1037458 | 9/2000 |
| EP | 1246453 | 10/2002 |

* cited by examiner

*Primary Examiner* — Yogesh K Aggarwal
(74) *Attorney, Agent, or Firm* — Donna P. Suchy; Nelson Adrian Blish (57) ABSTRACT

A method and apparatus for correcting signal differences between at least two adjacent parts of a radiation-sensitive sensor, each containing a contiguous set of radiation-sensitive sites read out through a respective separate electronic processing mean, by increasing the perimeter of the border between the adjacent parts of the sensor read out through separate electronic processing means and using at least one set of adjacent values from each of the adjacent parts to compute a correction to be applied to a signal read out of at least one of the adjacent parts.

15 Claims, 10 Drawing Sheets

BEFORE CORRECTION:
OFFSET = PIXEL

+ [□-▨] =

AFTER CORRECTION:
OFFSET ADDED TO LINE

IMAGE SENSOR MULTIPLE OUTPUT METHOD

CROSS-REFERENCE TO RELATED PATENT APPLICATIONS

This patent application claims priority from and is related to U.S. Provisional Patent Application Ser. No. 60/512,632, filed 20 Oct. 2003, this U.S. Provisional Patent Application incorporated by reference in its entirety herein.

FIELD OF THE INVENTION

The present invention relates to the field of digital photography and more specifically to a design and processing method for using two or more analog outputs of an image sensor.

BACKGROUND OF THE INVENTION

In state-of-the-art digital cameras or cameras with digital camera backs (hereinafter collectively referred to as backs) having large area sensors, the sensors are based on CCD or CMOS technology. In order to allow fast readout of the data from the image sensor, a multiple-output sensor is used. The multiple outputs give the option of reading the sensor data in parallel, hence at least double the readout speed.

An example is the Leaf Valeo 22 camera back, provided by Creo Inc., Canada, where two image sensor outputs are used in parallel to read the 22-Megapixel sensor. The main concern using this technology is calibrating the differences between the two output signals and the two analog processing means in such a way that no differences will be noticeable in the output image, even when the values are significantly amplified digitally subsequent to the analog processing.

Readout from two outputs of the image sensor can result in two image sections with an offset difference or a gain factor between them. If these are constant for each section, it is relatively easy to correct using calibration pixels placed so that light does not impinge on them. However, in many cases the offset and/or gain varies, depending on the location in the sensor, the sensor temperature and a time-varying factor in the analog readout and processing chain, possibly from very small fluctuations in voltage supply or other electronic and physical variables.

Common stitching algorithms, used in panoramic photography for example, are based on an overlap area between the two adjacent parts of the image. In image sensors with multiple outputs there is no overlap area between the different parts. Rather, the captured image is divided between the multiple outputs along straight division lines, constituting the entire common perimeter of the areas to be stitched. The relatively small number of pixels along these perimeters enhance the probability of stitching errors resulting from noise, a real image line placed on the border, etc.

SUMMARY OF THE INVENTION

It is a purpose of the present invention to provide means for producing quality images without any visible stitch line from image sensors that use more than one output.

In a first aspect of the present invention there is provided a method of correcting signal differences between at least two adjacent parts of a radiation-sensitive sensor, wherein each of said adjacent parts contains a contiguous set of radiation-sensitive sites read out through a respective separate electronic processing mean, said method comprising the steps of: increasing the perimeter of the border between said adjacent parts of the sensor read out through separate electronic processing means; and using at least one set of adjacent values from each of said adjacent parts to compute a correction to be applied to a signal read out of at least one of said adjacent parts.

According to one embodiment, the step of increasing the perimeter comprises shifting said radiation sensitive sites so that at least one of said sites located at said border between said adjacent parts will be read out though a different one of said separate electronic processing means than prior to said shift.

According to a second embodiment, the step of increasing the perimeter comprises shifting a first line so that N sites belonging to a first of said adjacent parts are enabled to be read out through a second one of said separate electronic processing mean; reading out said shifted first line through said respective separate means; shifting a second line so that N sites belonging to a second of said adjacent parts are enabled to be read out through the first one of said separate electronic processing means; and reading out said shifted second line through said respective separate means.

According to a third embodiment, each said first and second lines has N dummy pixels at each end thereof.

According to a third embodiment, said computing comprises: comparing each line of pixels to the lines above and below it; estimating the offset between the values of said adjacent parts of said line; and adding said estimated offset to each pixel of one of said adjacent parts of said line.

According to a fourth embodiment, said step of adding comprises: adding an averaged estimated offset of a plurality of lines to each pixel of one of said adjacent parts of said line.

According to a fifth embodiment, the method additionally comprises, after each said reading out steps, the step of aligning the two parts of each said read out lines.

According to a sixth embodiment, said aligning comprises using at least one FIFO buffer.

According to a seventh embodiment, said FIFO buffer is multiplexed between said respective electronic processing means.

According to an eighth embodiment, the step of increasing the perimeter uses an especially designed sensor having a tooth-like border between said adjacent parts thereof.

According to a ninth embodiment, said at least two adjacent parts comprise four adjacent parts, each part containing a contiguous set of radiation-sensitive sites read out through a respective separate electronic processing mean; and wherein said four adjacent parts comprise two pairs of adjacent parts, said pairs divided by said tooth-like border.

According to a tenth embodiment, the method additionally comprises, for each said pairs, the steps of: shifting a first line so that N sites belonging to a first of said adjacent parts are enabled to be read out through a second one of said separate electronic processing mean; reading out said shifted first line through said respective separate means; shifting a second line so that N sites belonging to a second of said adjacent parts are enabled to be read out through the first one of said separate electronic processing means; and reading out said shifted second line through said respective separate means.

According to an eleventh embodiment, each said first and second lines has N dummy pixels at each end thereof.

According to a twelfth embodiment, each said pairs comprises M dummy lines.

According to a thirteenth embodiment, said computing comprises, for each said pairs: comparing each line of pixels to the lines above and below it; estimating the offset between the values of said adjacent parts of said line; and adding said estimated offset to each pixel of one of said adjacent parts of said line.

According to a second aspect of the present invention there is provided an apparatus for correcting signal differences between at least two adjacent parts of a radiation-sensitive sensor, comprising: a radiation sensitive sensor having at least two adjacent parts, each said parts containing a contiguous set of radiation sensitive sites, said sensor additionally comprising separate electronic processing means for reading out said respective contiguous sets; means for storing at least two sets of signals output from said at least two processing means; means for computing a desired correction between said at least two stored sets of signals; and means for correcting at least one of said sets of signals according to said computed desired correction.

According to a first embodiment, said means for storing comprise means for aligning said at least two sets of signals output from said at least two processing means.

According to a second embodiment, said means for aligning comprise at least one FIFO buffer.

According to a third embodiment, the apparatus additionally comprises means for multiplexing said FIFO buffer is multiplexed between said respective electronic processing means.

According to a fourth embodiment, said sensor comprises dummy pixels at least on each end of each line thereof.

According to a fifth embodiment, said sensor has a tooth-like border between said adjacent parts thereof.

According to a sixth embodiment, said at least two adjacent parts comprise four adjacent parts, each part containing a contiguous set of radiation-sensitive sites read out through a respective separate electronic processing mean; and wherein said four adjacent parts comprise two pairs of adjacent parts, said pairs divided by said tooth-like border.

According to a seventh embodiment, each said pair comprises dummy lines.

According to an eighth embodiment, said means for computing comprises means for rotating said signal sets.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

The invention comprises two innovations; the first is a new method of operating the readout of the image sensor and the second is an image processing algorithm for stitching the two or more parts of data created by the unique readout method.

Figure 3A:
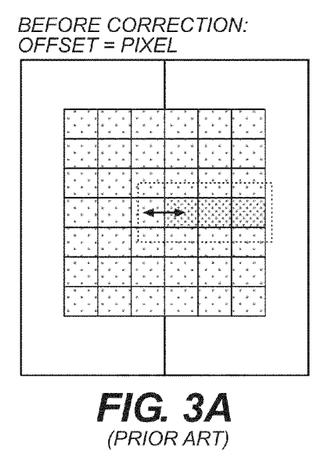
FIGS. 3A and 3B illustrate a prior art offset correction algorithm.
Figure 3B:
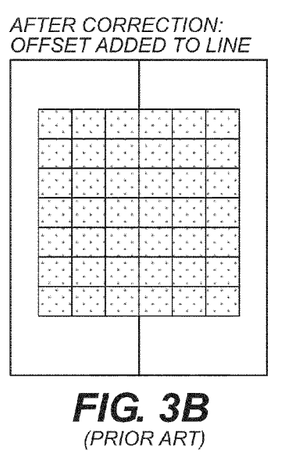

In order to appreciate the new readout method, we briefly describe a naïve method for stitching together two aligned image sections without overlap (FIGS. 3A and 3B). The method corrects for a varying offset in which the average value difference between pixels from two sides along the common border at the top of the sensor varies from the average value difference between pixels from two sides along the common border at the bottom of the sensor. After the offset addition, both sections will have the same pixel values on their common border all long the sensor from top to bottom.

As can be seen in FIG. 3A, a varying offset exists between the left side and the right side of the image, at the fourth row. The image data on the common border from one (say right) side is subtracted from the other (left) side to provide the offset between the two sections at the given point. The offset is then added to every pixel in the entire line lying in the right section. Now the two adjacent pixels have equal values, eliminating the visible stitch line at this point (FIG. 3B).

It should be noted that this algorithm also provides a partial correction for small gain factor differences, since these are usually visible only when they line up along an edge and not when they exist at separate locations. Differences in value from different readout sections on objects lying across the border are compensated for, whether they arise from gain or small offset differences. For similar objects on either side of the border, even though the values of the object at certain illuminations on one side may be different from the values of the same object on the other side at the same illumination, these differences are generally unnoticeable because of the intervening space.

However, this naïve algorithm is subject to several problems:

1. There are cases where an edge exists in the content of the image exactly on the join of the 2 image sections.
2. Most images contain noise; thus comparison of one specific pixel pair along the border may provide an inaccurate offset estimate.
3. A change to one line and then a (different) change to the following line may cause a high frequency line-varying pattern.

To overcome these problems, the algorithm: (1) checks that there is no edge at the current point and includes only non-edge pixels; (2) maintains a running average of the offset estimate from non-edge pixels in N successive lines; and (3) adds the offset estimate to the central line of the N successive lines.

Figure 1:
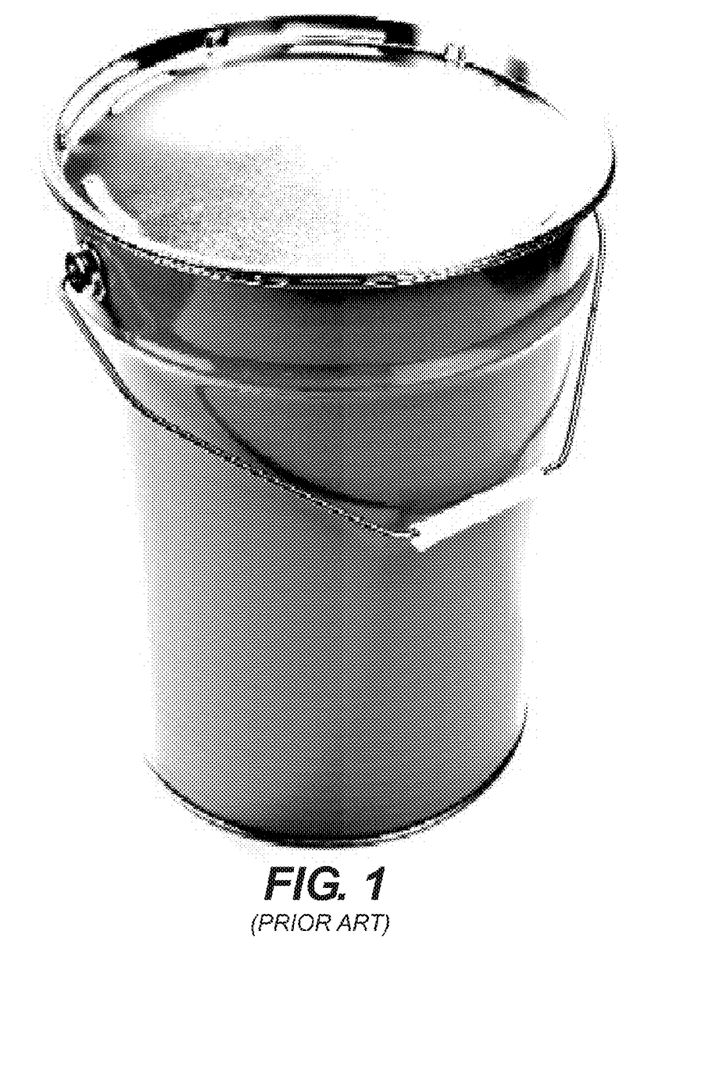
FIGS. 1 and 2 show examples of the visible stitch line between the two parts of a sensor, even after average offset and gain factor corrections have been implemented.
Figure 2:
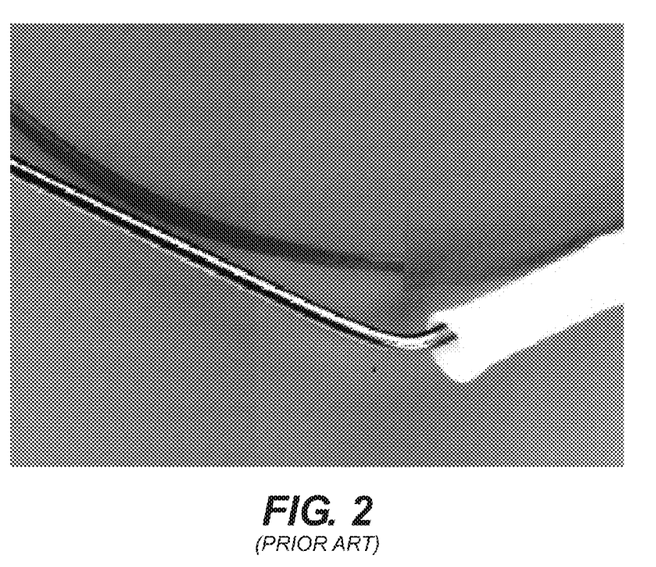

In general, the above method is ineffective in the case of significant image noise, where the border pixels do not provide a reliable estimate of the actual analog offset at the border, even with a running average of, say, 100 successive lines. In this case, when viewed at a distance, a clear line is visible as illustrated in FIGS. 1 and 2. This mostly occurs in underexposed images or in shadow areas.

To overcome this problem it is necessary to increase the reliability of the offset estimate. This can be done by increasing the perimeter area of the border between two different readout sections.

A first embodiment of the new method of the present invention increases the perimeter of the border between readout sections by changing the standard way in which pixels are read out of the sensor. It also corrects the algorithm to take into account the new readout method.

The increase in the perimeter of the border between readout sections is effected by reading out the lines through the two parallel analog processing means in a partially interleaved manner.

Figure 4:
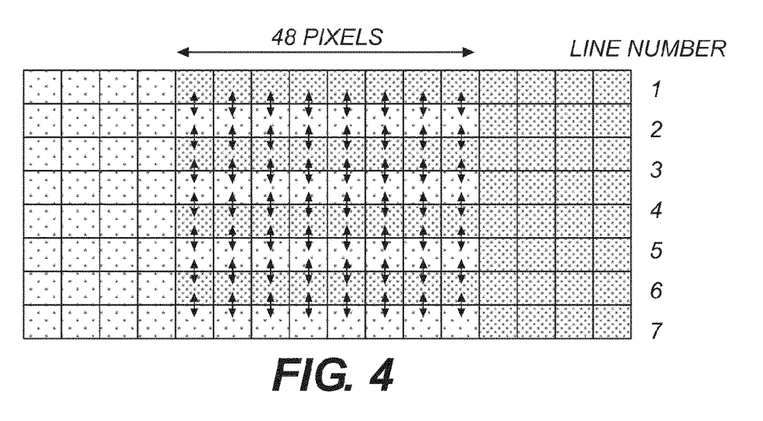
FIG. 4 illustrates an interleaved border between the readout sections of two senor outputs, according to the present invention.

FIG. 4 illustrates an interleaved border of size 48 pixels between the readout sections of two outputs: the "lightly textured" pixels are read through the first output and the "heavily textured" pixels are read through the second output. It will be understood that any other suitable number of interleaved pixels may be chosen.

In this embodiment of the invention each line of pixels is compared to the lines above and below it. In this manner the border between the two readout sections has been lengthened by a factor of 48. This increases the reliability of the estimate by a factor of approximately the square root of 48, i.e. approximately 7.

The algorithm is now implemented as follows:

Let $P_{i,j}$ be the pixel values.

$S_l = \{(i,j): i=l, j=j1 \ldots j1+47\}$ represents a portion of a single line l at the interleave location.

$S_{l+1} = \{(i,j): i=l+1, j=j1 \ldots j1+47\}$ is the aligned portion of the line below. Suppose $S_l$ is read out through analog processing mean 2 (right hand side) and $S_{l+1}$ is read out through analog processing mean 1 (left hand side).

$d_{i,j} = P_{i,j} - P_{i+1,j}$ if $(l-i \bmod 2) = 0$ else $d_{i,j} = P_{i,j+1} - P_{i,j}$.

$d_{i,j}$ is an estimate of the offset between readout section 1 and readout section 2 at line i. The sign flip is necessary because of the interleave of analog outputs 1 and 2.

$edge_{i,j} = abs(((P_{i,j} + P_{i,j+1} P_{i,j+2} + P_{i,j+3}) - (P_{i+1,j} + P_{i+1,j+1} + P_{i+1,j+2} + P_{i+1,j+3}))/4)$ is an estimate of the edge along the border. If this edge is large, there is a real object edge. If very small, it represents the offset difference.

Edge $= \{(i,j): edge_{i,j} > threshold, (i,j) \in Sl\}$ $D = \{d_{i,j}: (i,j) \in S_l, d_{i,j} = 0$ if $(i,j) \in$ Edge else $(d_{i,j} = P_{i,j} - P_{i+1,j}$ if $(l-i \bmod 2) = 0$ else $d_{i,j} = P_{i,j+1} - P_{i,j}\}$.

OFFSET$_{i,j}$ is the offset estimate for line i. It is computed as follows:

OFFSET$_{i,j}$ = Sum$[d_{k,l}: i-N/2 < k <= i+N/2, j1 < j < j1+47$, $d_{k,l} \in D]/(48N)$.

N is say 100. This gives 4800 sample pairs for the offset average.

The correction to the right hand side ($j >= j1$) of line l is then:

$P_{i,j} = P_{i,j} + $ OFFSET$_{i,j}$

The algorithm implements a varying offset correction that ensures that near and along the border, pixels on both sides are brought to the same local average value.

We now describe means for reading out the two interleaved sections from a typical image sensor.

Figure 5:
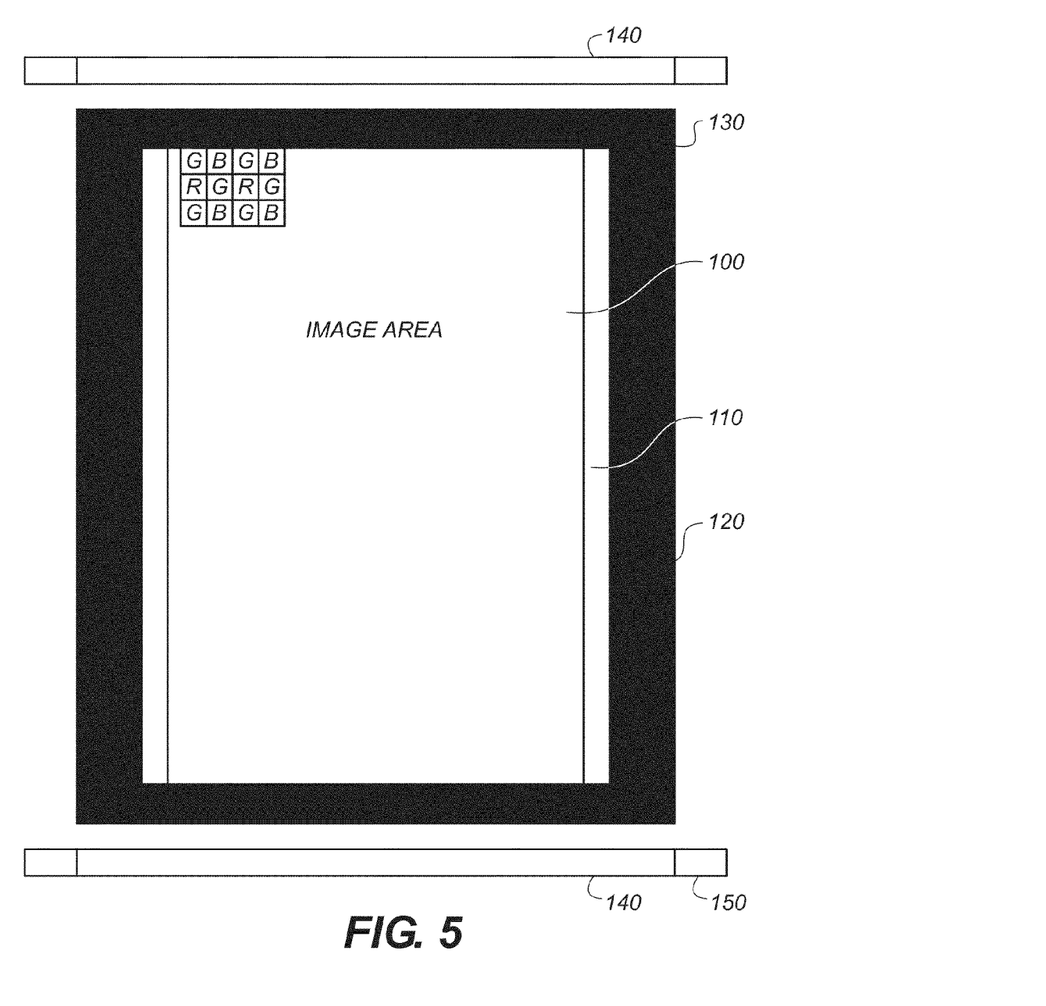
FIG. 5 is a schematic drawing of an image sensor for performing one preferred embodiment of the present invention.

In order to receive the mixed outputs structure, a new readout sequence was invented. The method is based on a basic structure of an image sensor, example of such a sensor is shown in FIG. 5. The main area of the sensor is the image area 100, where the charge is generated and integrated in each pixel. Each one of the pixels 160 is selectively covered with red, green or blue pigmented filters for color separation. The photoactive pixels are surrounded by a border of buffer 110 and light shielded 120 pixels as shown in FIG. 5. In this example we can note a border of 20 black columns and 4 buffer columns on each side of the active area (called in next paragraph, dummy pixels) and 6 black lines 130 at the top and bottom of the sensor. Output shift registers 140 are located below and above the Image area for charge readout. After the image area 100 is exposed to light during the integration time, the charge is shifted one line at a time toward the shift register 140. From the shift register the charge is transferred to the dual output amplifiers 150 that drive the signal to the outside world.

The sensor has control signals that can shift a whole line (in the output shift register) to the left side or to the right side (single output mode) and also split the line into 2 outputs in parallel, each of which can be independently shifted (double output mode). In the example of FIG. 5, the sensor has 24 dummy pixels (black and buffer columns) on either side.

Figure 6A:
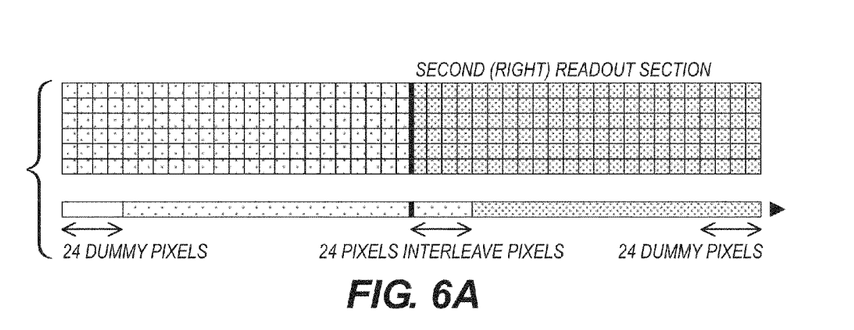
FIGS. 6A to 6F and FIG. 7 illustrate the stages of performing the method of the present invention according to one preferred embodiment.
Figure 6B:
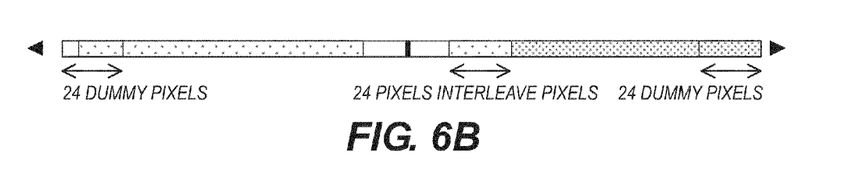
Figure 6C:
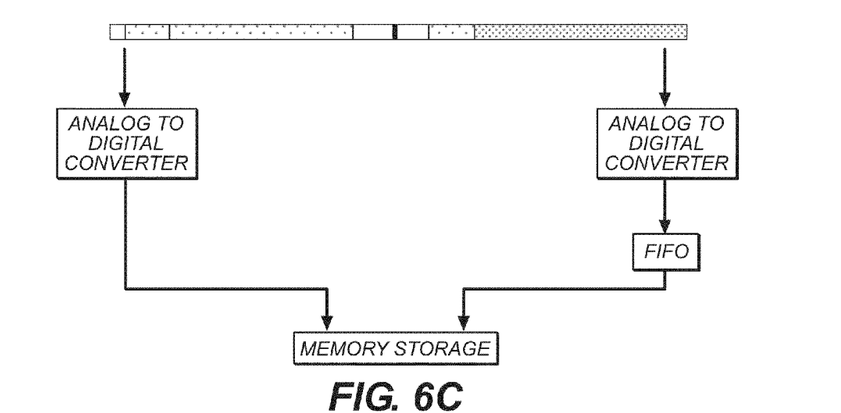
Figure 6D:
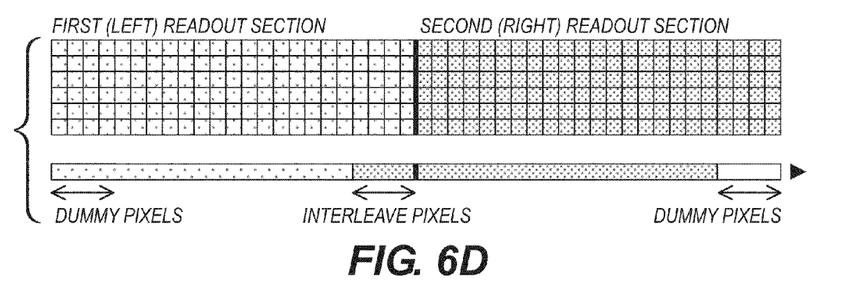
Figure 6E:
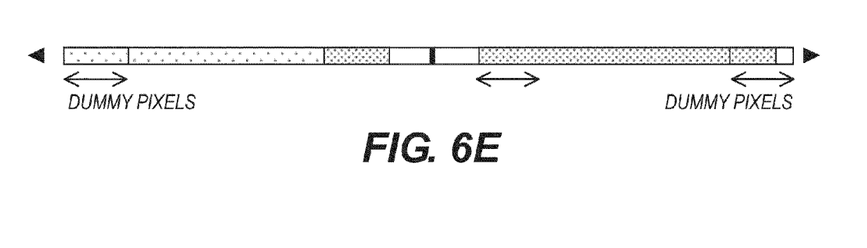

The new readout sequence comprises the following steps:
1. Using single output mode, shift the first line 24 pixels to the right, into the region of the 24 dummy pixels (FIG. 6A).
2. Using double output mode, continue with normal readout of both outputs in parallel to left and right sides (FIG. 6B).
3. The second line is shifted in a similar manner but to the left side of the sensor by 24 pixels (FIG. 6D).
4. Continue with normal readout of both outputs in parallel left & right sides (FIG. 6E).

The same sequence of operations may be performed on a sensor having any number of dummy pixels. It may also be performed on a sensor having no dummy pixels, in which case there will be a loss of e.g. 24 pixels on each side of the image.

Implementation of the interleaved readout as described above, raises a need for alignment of the two parts of each output line. In our example of 24 dummy pixels, after 24 pixels have been shifted to the right (FIG. 6A), the data from the CCD is not aligned; the first shift clock will output from the right side the first active pixel and from the left side a non-active pixel.

Synchronization of the two outputs may be implemented by using a FIFO (first in first out) buffer that stores the 24 first pixels from the right side; after 24 read clocks from the CCD we will have the first pixel on the right side and the first pixel on the left side aligned and ready to be stored in the main memory storage. The external FIFO buffer may be connected in series with the right A/D converter. The FIFO storage is configured and activated in such a way as to ensure that the lines are realigned back to position in the final image memory storage (FIG. 6C).

Figure 6F:
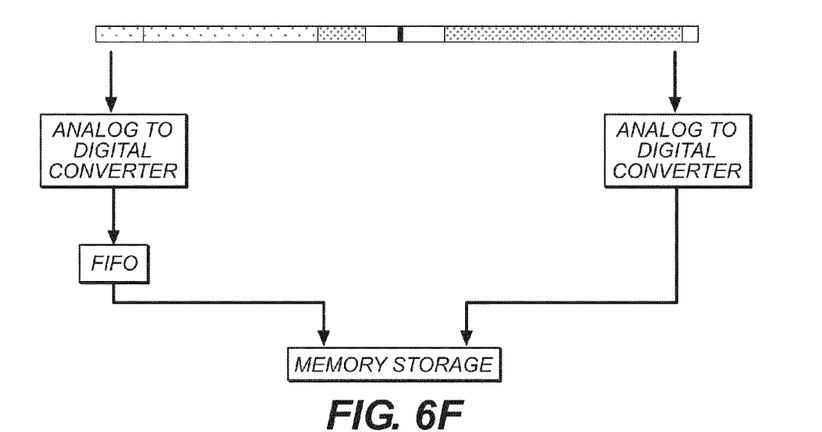

Reading out the second line of the CCD will be done in a similar manner, but now the FIFO is connected to the left side of the sensor (FIG. 6F).

In order to implement the FIFO multiplexing described above, we may use either a FPGA design, where we can internally multiplex the two A/D outputs to one FIFO, using the readout state machine as a controller, or we can use a discrete design with external FIFO and multiplexer.

It will be understood that any other alignment scheme known in the art may be used to align the two parts of each readout line.

Figure 7:
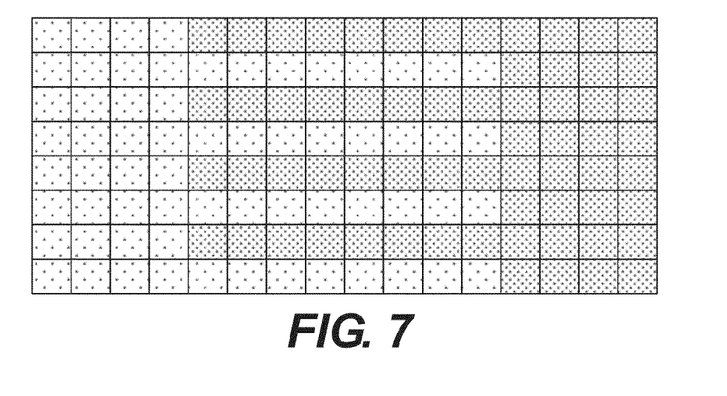

The final image is arranged in the memory storage in the manner depicted in FIG. 7 and is processed by the offset algorithm in order to remove the differences between the two parts of the image.

The above embodiment enables the creation of a long interleaved border between two parallel-output sides of a sensor. It requires no special changes to a sensor.

Figure 8:
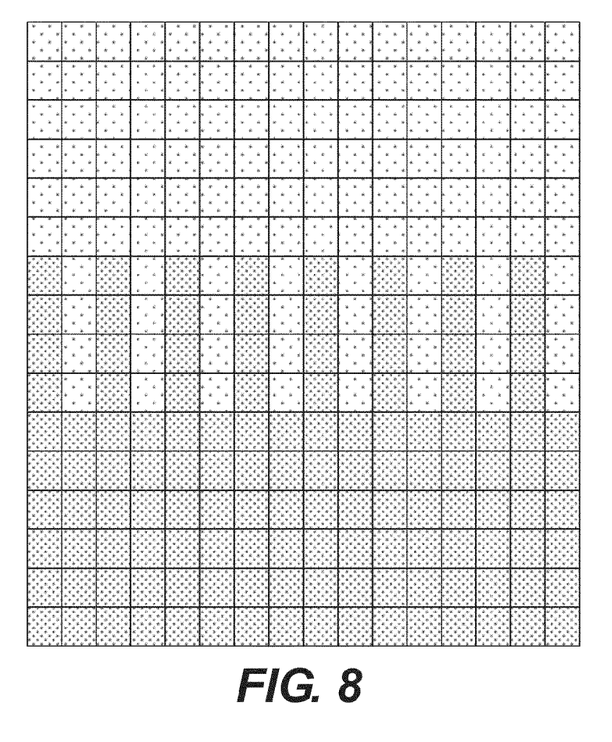
FIG. 8 is a schematic drawing of an image sensor for performing the method of the present invention according to a second preferred embodiment.

In an alternative embodiment, as shown in FIG. 8, an especially designed sensor may be used to enable the method of lengthening the border between the two sensor parts. FIG. 8 depicts a tooth-like horizontal border between the upper and lower parts of the sensor. To obtain the desired tooth-like perimeter, the sensor is designed in such a way that its upper and lower halves behave as follows: every odd-numbered column pixel in the bottom 24 lines of the upper readout section is shifted down instead of up. These pixels are read out as part of the bottom half of the sensor. Similarly, every even-numbered column pixel in the top 24 lines of the bottom readout section is read out as part of the top half of the sensor.

The readout sequence according to this embodiment uses the single output mode to shift out rows from both top and bottom ends of the sensor to two respective output shift registers. The 48 rows of the tooth-like area will be split between the two parts. A subsequent stitching algorithm ignores every other pixel in those rows and replaces them with the respective pixels of the opposite (top/bottom) row. The offset algorithm as described above can then be performed on the image data in memory, with rows and columns exchanging roles.

Figure 10:
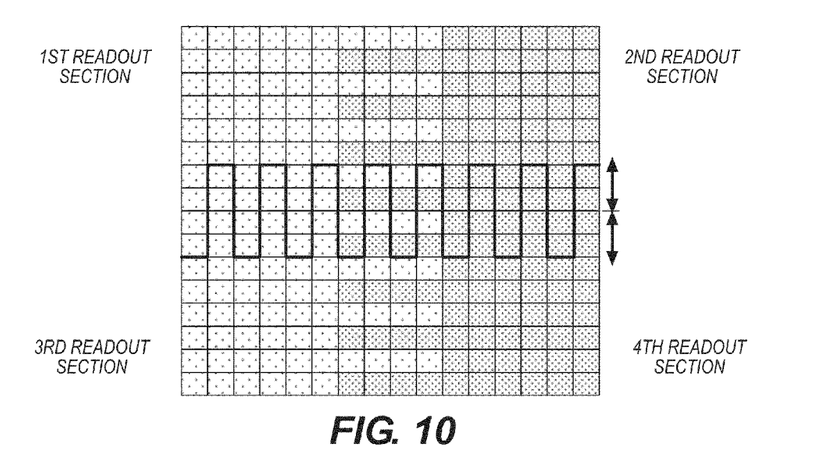

It is possible to expand this basic idea to a sensor having four outputs. FIG. 10 depicts the readout sections from a regular four-output sensor when used in a four-output mode. The top and bottom halves are read out simultaneously, each in exactly the same manner as described above with respect to a regular sensor used in two-output mode, where the outputs are to left and to right. The two quarters of the bottom half use a bottom shift register and the two quarters of the top half use a top shift register.

Figure 9:
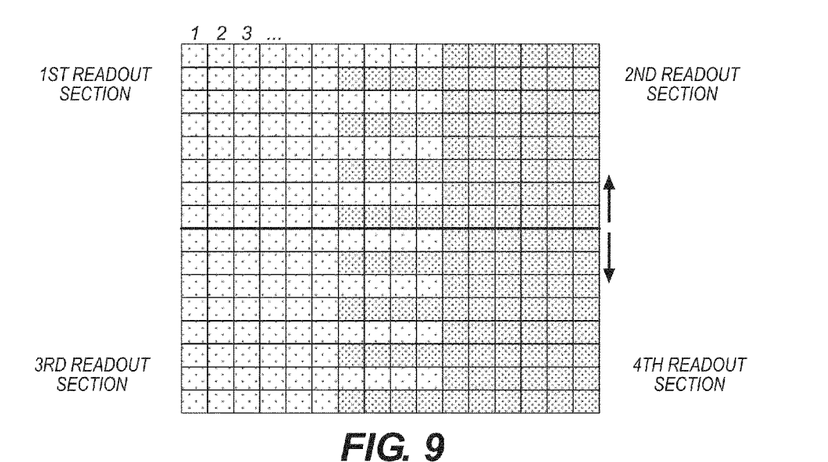
FIGS. 9 to 11 illustrate the stages of performing the method of the present invention according to the second preferred embodiment.

However, correction of difference between the lower and upper sections on each side requires increasing the perimeter of the horizontal border between them. FIG. 10 depicts a tooth-like horizontal border, as in the embodiment of FIG. 8, instead of the straight border shown in FIG. 9. The readout of each half (upper and lower) proceeds as described in the previous embodiment with respect to a double output sensor, including the shifts and switching between single and multiple output modes, except for one addition—an extra 24 lines are read out in both the lower and upper halves. The lower half now contains the odd-numbered columns of the last 24 lines read out of the upper half and the upper half now contains the even-numbered columns of the last 24 lines read out of the lower half.

The upper and lower readout sections are recombined in the memory storage and may be corrected for local vertical gain and offset differences in a manner similar to the method described above with respect to local horizontal differences.

The algorithm for correcting the differences along all four borders of the four readout sections is as follows:
(1) First perform the two output algorithm, as described above for horizontal interleave;
(2) Rotate the image in memory by 90 degrees clockwise; and
(3) Perform the two-output algorithm a second time with appropriate changes to the number of rows, the number of columns and the parameter j1.

Figure 11:
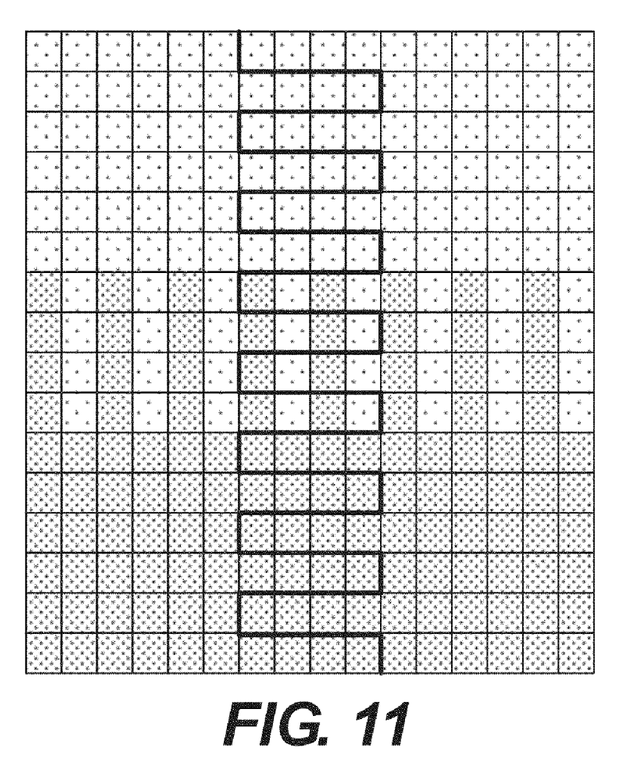

FIG. 11 depicts the rotated image to which the algorithm is applied the second time, to compensate for differences between the lower and upper halves of the sensor, using the interleaved perimeter obtained by the new sensor readout design described above. The pre-rotation "left" and "right" readout sections are represented by the light and heavy textures. The pre-rotation "upper" and "lower" halves are now the left and right sides of the image. The horizontal correction algorithm now effectively corrects for local gain and offset differences from the "upper" and "lower" halves.

The invention claimed is:

1. A method of correcting signal differences between at least two adjacent parts of a radiation-sensitive sensor, each said adjacent parts containing a contiguous set of radiation-sensitive sites read out through a respective separate electronic processing means, said contiguous sets being collinear, said method comprising the steps of:

increasing the perimeter of the border between said adjacent parts of the sensor read out through separate electronic processing means;

using at least one set of adjacent values from each said adjacent parts to compute a correction to be applied to a signal read out of at least one of said adjacent parts;

wherein said step of increasing the perimeter comprises:
shifting a first line so that N sites belonging to a first of said adjacent parts are enabled to be read out through a second one of said separate electronic processing mean;

reading out said shifted first line through said respective separate means;

shifting a second line so that N sites belonging to a second of said adjacent parts are enabled to be read out through the first one of said separate electronic processing means;

reading out said shifted second line through said respective separate means;

wherein each said first and second lines has N dummy pixels at each end thereof;

additionally comprising, after each said reading out steps, the step of aligning the two parts of each said read out lines; and wherein said aligning comprises using at least one FIFO buffer.

2. The method of claim 1, wherein said step of increasing the perimeter comprises shifting said radiation sensitive sites so that at least one of said sites located at said border between said adjacent parts will be read out though a different one of said separate electronic processing means than prior to said shift.

3. The method of claim 1, wherein said FIFO buffer is multiplexed between said respective electronic processing means.

4. A method of correcting signal differences between at least two adjacent parts of a radiation-sensitive sensor, each said adjacent parts containing a contiguous set of radiation-sensitive sites read out through a respective separate electronic processing means, said contiguous sets being collinear, said method comprising the steps of:

increasing the perimeter of the border between said adjacent parts of the sensor read out through separate electronic processing means;

using at least one set of adjacent values from each said adjacent parts to compute a correction to be applied to a signal read out of at least one of said adjacent parts; and wherein the step of increasing the perimeter comprises using an especially designed sensor having a tooth-like border between said adjacent parts thereof.

5. The method of claim 4, wherein said at least two adjacent parts comprise four adjacent parts, each part containing a contiguous set of radiation-sensitive sites read out through a respective separate electronic processing mean; and wherein said four adjacent parts comprise two pairs of adjacent parts, said pairs divided by said tooth-like border.

6. The method of claim 5, additionally comprising, for each said pairs, the steps of:

shifting a first line so that N sites belonging to a first of said adjacent parts are enabled to be read out through a second one of said separate electronic processing mean;

reading out said shifted first line through said respective separate means;

shifting a second line so that N sites belonging to a second of said adjacent parts are enabled to be read out through the first one of said separate electronic processing means; and reading out said shifted second line through said respective separate means.

7. The method of claim 6, wherein each said first and second lines has N dummy pixels at each end thereof.

8. The method of claim 5, wherein said computing comprises, for each said pairs:

comparing each line of pixels to the lines above and below it at least one site of each said adjacent parts that was read out through a different one of said separate electronic processing means;

estimating the offset between the values of said adjacent parts of said line; and adding said estimated offset to at least one pixel of one of said adjacent parts of said line.

9. The method of claim 8, additionally comprising rotating the thus corrected lines 90° and repeating said step of computing.

10. An apparatus for correcting signal differences between at least two adjacent parts of a radiation-sensitive sensor, comprising:

a radiation sensitive sensor having at least two adjacent parts, each said parts containing a contiguous set of radiation sensitive sites, said contiguous sets being collinear, said sensor additionally comprising separate electronic processing means for reading out said respective contiguous sets;

means for storing at least two sets of signals output from said at least two processing means;

means for computing a desired correction between said at least two stored sets of signals;

means for correcting at least one of said sets of signals according to said computed desired correction;

wherein said means for storing comprise means for aligning said at least two sets of signals output from said at least two processing means; and wherein said means for aligning comprise at least one FIFO buffer.

11. The apparatus of claim 10, additionally comprising means for multiplexing said FIFO buffer between said respective electronic processing means.

12. The apparatus of claim 10, wherein said collinear contiguous sets of pixels from said adjacent parts contain at least one dummy pixel on each end of each line thereof.

13. An apparatus for correcting signal differences between at least two adjacent parts of a radiation-sensitive sensor, comprising:

a radiation sensitive sensor having at least two adjacent parts, each said parts containing a contiguous set of radiation sensitive sites, said contiguous sets being collinear, said sensor additionally comprising separate electronic processing means for reading out said respective contiguous sets;

means for storing at least two sets of signals output from said at least two processing means;

means for computing a desired correction between said at least two stored sets of signals;

means for correcting at least one of said sets of signals according to said computed desired correction; and wherein said sensor has a tooth-like border between said adjacent parts thereof.

14. The apparatus of claim 13, wherein said at least two adjacent parts comprise four adjacent parts, each part containing a contiguous set of radiation-sensitive sites read out through a respective separate electronic processing mean; and wherein said four adjacent parts comprise two pairs of adjacent parts, said pairs divided by said tooth-like border.

15. The apparatus of claim 14, wherein said means for computing comprises means for rotating said signal sets.

* * * * *